2,815,192

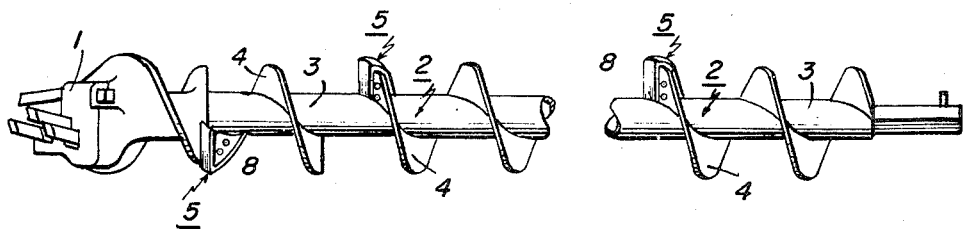
FIG. 1
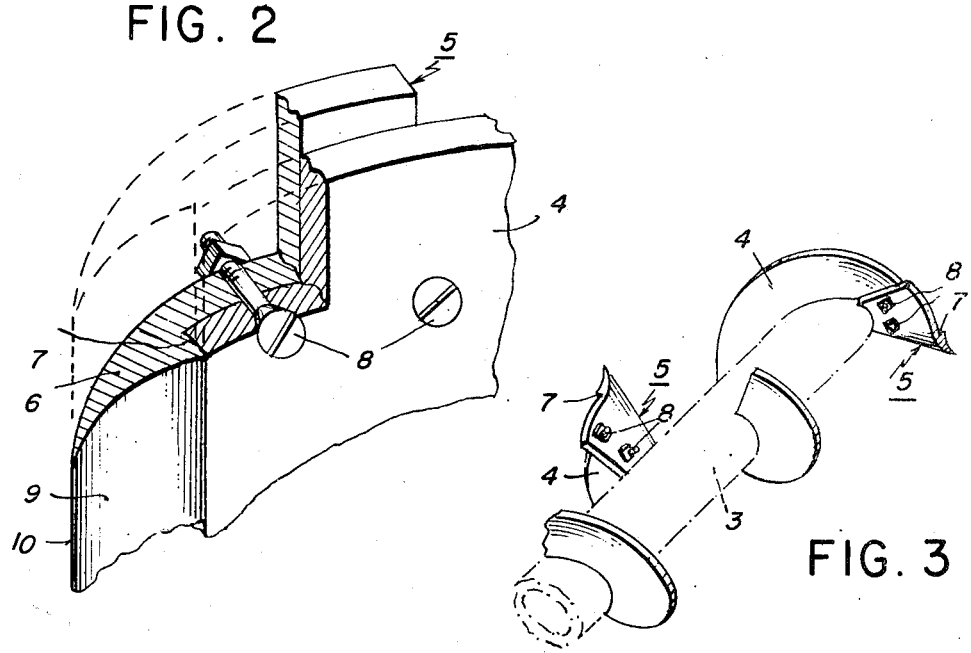
FIG. 2
FIG. 3
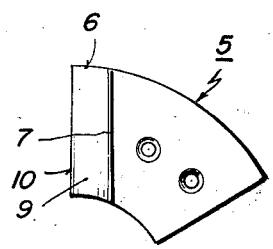
FIG. 4
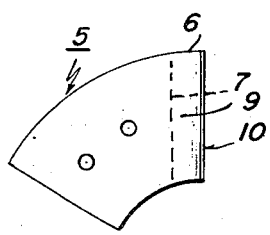
FIG. 5
INVENTOR
ALAN JAY PARRISH, United States Patent Office 2,815,192
Patented Dec. 3, 1957

EARTH BORING AUGER SECTION AND CUTTER

Alan Jay Parrish, Paris, Ill.

Application November 18, 1955, Serial No. 547,665

2 Claims. (Cl. 255—69)

This invention relates to improvements in earth boring augers and cutters therefor, and, more particularly, it relates to improvements in augers and auger sections of the type shown in my prior Patent No. 2,221,680.

Augers of the type in which this invention constitutes an improvement are employed in continuously progressive boring or running of holes of great length under heavy load conditions in all kinds of soil or soil combinations. In extended boring operations, the highest degree of accuracy obtainable, avoidance of tool breakage and withdrawing of augers for repair or cleaning are factors of great importance in the economy of boring operations. Augers of my prior patent employ sections which may be detachably connected for extended drilling. These sections have tubular shafts each being provided at opposite ends with suitable means for detachable association with other auger sections. Each section is provided with spaced or interrupted spiral cutting and material conveying flights of mild steel disposed longitudinally of the tubular shaft and fixed thereto. It has heretofore been the practice to bevel the leading edges of the flight sections to define secondary cutting or chopping edges thereon and to weld thereto cutter extensions to provide an increased outside diameter cutting characteristic, thus depending upon the mild steel of the relatively thin flight portions to do a secondary cutting or chopping of the plug or packed material being conveyed by the auger at the point of interruption of the flights, and, to cut the hole to oversize to relieve load ease withdrawal.

Retention of normal size and position of secondary flights and cutter combinations is necessary for continuously progressive boring with accuracy. In augers of my prior patent, utilization of the beveled mild steel edges and the welded cutters of the flight sections resulted in heavy wear together with considerable transverse stress on the relatively thin flight portions, tending to deform the flight portions and being conducive to short operational life and lack of efficiency. In order to lengthen the life of tools in field operations, brazing or welding has been resorted to in building up and restoring the flights and cutters by way of repairs. This is seldom done by experts or in a skilled manner to produce normalcy and often results in oversize or deformed tools with the result of loss of accuracy and abnormal breakage of equipment.

The present invention has for one of its objects the provision of augers and auger sections of the type described improved in points of strength, stress distribution, cutting results and length of operative life.

Another object is the provision of an auger with secondary flights and cutter combinations which can be easily serviced in the field to maintain its normalcy in avoidance of frequent replacement of the secondary flights.

Other objects and advantages of the invention which are inclusive of the provision of an auger section with secondary flights having detachable hardened cutters which produce a shaving result and provide distribution of operational stresses edgewise and longitudinally of the flights, the provision of a new flight and cutter combination, and the provision of a novel cutter element will become apparent from the hereinafter detailed description of the invention having reference to the accompanying drawing wherein Fig. 1 is a plan view of an extended auger embodying auger sections with secondary flight and cutter combinations of the invention.

Fig. 2 is an enlarged broken view of part of an auger section showing the relation of the leading and trailing portions of spaced flights and with the leading portion being shown partly in horizontal section to show the cutter attachment disposition and mounting.

Fig. 3 is a perspective view of the secondary flight and cutter attachment combination.

Figs. 4 and 5 are opposite face views of the cutter attachment.

Having reference to the drawing, Fig. 1 thereof in particular, a complete auger of the type involved comprises a boring head 1, forming no part of this invention, and one or more auger sections 2 detachably associated with the head. Each auger section is provided at its end portions with connecting means adapted for cooperative association with counterpart connecting means on the head, another auger section and/or a mechanical drive means. The connectors employed are not part of this invention and may be those of my prior patent and may be hexagonal interfitting members between parts with releasable latch means for holding the parts in assembly.

Each auger section 2 comprises the tubular shaft 3 provided at its ends with the aforesaid connecting means adapting it for connection between a boring head and a drive connection or between the head and another or plurality of auger sections which in turn are connected to a mechanical drive. Fixed to the shaft by welding or the like are a plurality of spaced or interrupted radially extending spiral flight portions which constitute a spiral flight and cutter combination. These flights must be very tough in view of the heavy loads thereagainst in operation and are made of mild steel, and, though broken in continuity throughout the length of an auger section to provide a spaced relation, the planes of the flights projected afford a continuity. The flight portions are so proportioned as to leave shorter end portions than the intermediate spiral combinations so that when joined with another auger section the shorter flight portions on the end of each section may cooperate to form a longer flight portion.

Instead of depending upon beveling the secondary flights at the leading edges, these flights are associated with a hardened cutter 5 fixed to the leading edge of the flight or flights 4. It is to be noted from the illustration of the cutter attachment 5, as illustrated in the drawings, that it constitutes an enlarged cutter element of greater thickness than the web of the secondary flight, and, that besides being conformed in its spiral plane with the surface of the cutting and conveying flight, it is wider at the forward or cutting portion than the web of the flight to provide a radially increased shaving or cutting portion forwardly and outwardly, respectively, of the forward and outer edge portions of the flight element. This, in effect, produces an increased cutting diameter for the auger confined, however, to the spaced leading edges of the secondary cutting and conveying flight.

Flight elements 4 have square cut forward ends defining on each a transverse flat face disposed in a plane substantially at a 90° angle with respect to the normal longitudinal plane of the flight element. This affords a true seat for the detachable cutter element 5 which is of hardened steel or steel alloy and has a thickened head or cutting portion 6 and a transverse shoulder 7, adapted to seat against the end of the flight, and a rearwardly extending relatively narrow web portion formed to seat against the side of the flight. The cutter attachment when so mounted on the flight element is fixed thereto by suitable screws or bolts 8 passing through the cutter attachment and the flight. Portions 6 providing continuity of forwardly facing surface of flight 4 to a leading cutting edge 10 transverse the width of the flight and the entire width of the cutter element. The thickness of the cutter element, forwardly of shoulder 7, is progressively reduced to the cutting edge 10. In this combination of flight element and cutter attachment, wear in boring operations is practically confined to the cutter attachment 5 and stresses thereon are against the end and longitudinally of the conveyor flight. Flight elements are seldom damaged and normalcy of the auger may be easily maintained by the simple replacement of the detachable cutter attachment. This is important because much greater accuracy is obtainable with normal tools. Moreover, the arrangement avoids the necessity of substitution of entire auger sections for damaged ones in making repairs, results in saving time and avoids breakage of equipment. It also minimizes the amount of equipment necessary in field operations, a mere supply of cutter attachments enabling an operator to maintain normalcy of equipment which results in saving of time, greater accuracy and less tool withdrawal in operations.

Auger sections described are employed chiefly in conjunction with horizontal boring machines which have a guided feed and drive mechanism. In operation, an auger section is connected between a boring cutter head and the drive of the machine, and in extended boring or running holes of great length, successive auger sections are joined by backing off the machine or its feed for insertion and connection of additional sections. Continuously progressive drilling is obtained in this manner. Under some soil conditions the load on augers is very heavy and continuous spiral conveyor flights tend to pack or plug so as to require repeated withdrawal for cleaning. In augers of the type here involved, the load of material forced along the auger is cut or shaved into separate components by the secondary cutters at the leading ends of the spaced conveyor flight elements. The secondary cutter attachments thus break up the packed or plugged material and by the successive cutting thereof and cutting of the hole larger than the diameter of the intermediate flight sections, the material is forced rearwardly with a minimum of frictional load and the hole is kept clean and accurate. Auger sections embodying the cutter and spiral flight attachments hereinbefore described afford a new and improved cutting result in the operations described. Auger sections of the prior patent depended upon the relatively thin leading edge of mild steel conveyor flights to break up the packed material or plug and this was done more in a tearing action with high transverse stress on the flights, whereas the improved flights and cutter attachments have a shaving or slicing effect and better stress distribution. The cutter attachments form real cutting heads of greater cross section hardened material. Furthermore, the cutter attachments are replaceable in the improved structures, whereas in the prior structures brazing or welding had to be resorted to in build-up of uncertain accuracy or the section had to be replaced.

I claim:

1. In a detachable auger section having a tubular shaft and connecting means at each end thereof for detachable association as a section in an earth boring auger, a plurality of spiral cutting and conveying elements fixed to the auger shaft in spaced relation thereon to define an interrupted spiral conveyor flight longitudinally of the section, each of said elements comprising a spiral mild steel web having the leading edge thereof square cut to define a flat surface across the web, a hardened metal cutting attachment of greater width than the web and having an enlarged head portion presenting a forward cutting edge and a rearwardly extending web portion of reduced thickness contoured to lie against the rear face of the spiral web of a conveyor element, the said reduced web portion lying adjacent a transverse bearing shoulder on the head portion equal in depth to thickness of the spiral web engaged with the forwardly facing flat end surface of the web, and means passing through the web of the conveying flight and the reduced web portion of the cutting attachment for detachably mounting the cutter attachment in its supported position on the conveying flight.

2. In a detachable auger section having a tubular shaft and connecting means at each end thereof for detachable association as a section in an earth boring auger, a plurality of mild steel cutting and conveying spiraled webs of even diameter fixed to the auger shaft longitudinally thereof and in spaced relation, each of said webs having its leading end formed to provide a flat forwardly facing bearing surface extending from the shaft outwardly to the edge of the web, a demountable hardened cutter attachment of spiral conformation associated with the leading end of each of said spiral webs, said cutter attachment having a cutting head thicker and wider than said webs to extend across a web and beyond the outside diameter thereof, said cutting head having a leading transverse cutting edge and spaced therefrom a transverse shoulder equivalent in depth to thickness of said web for seating against the end of a spiral web and a rearwardly extending portion adapted to overlie and conform to the rearwardly facing surface of the spiraled web the forward facing surfaces of the cutting head and adjacent web defining a substantially smooth surface continuity, and removable fastening means passing through said extending portion and the web detachably mounting the cutter in its supported position.

References Cited in the file of this patent

UNITED STATES PATENTS

| | | |
|---|---|---|
| 2,221,680 | Parrish | Nov. 12, 1940 |
| 2,709,573 | Reed | May 31, 1955 |

FOREIGN PATENTS

| | | |
|---|---|---|
| 135,867 | Australia | Jan. 11, 1950 |